United States Patent [19] [11] Patent Number: 4,788,464
Nishikawa et al. [45] Date of Patent: Nov. 29, 1988

| [54] | DISC DRIVE WITH INTEGRAL SPINDLE YOKE |
|---|---|
| [75] | Inventors: Mitsuo Nishikawa, Kanagawa; Souichi Murakami, Tokyo, both of Japan |
| [73] | Assignee: Sony Corporation, Tokyo, Japan |
| [21] | Appl. No.: 110,276 |
| [22] | Filed: Oct. 20, 1987 |
| [30] | Foreign Application Priority Data |
| | Oct. 29, 1986 [JP] Japan .................. 61-166078[U] |
| [51] | Int. Cl.⁴ .................... H02K 1/02; H02K 21/24 |
| [52] | U.S. Cl. ................................ 310/268; 310/43; 310/156 |
| [58] | Field of Search .............. 310/43, 67 R, 68 R, 310/156, 268, 44, 45, 261; 360/97, 99 |

[56] References Cited

U.S. PATENT DOCUMENTS

| 4,329,606 | 5/1982 | Montagu | 310/67 R |
| 4,337,405 | 6/1982 | Hishida | 310/43 |
| 4,529,900 | 7/1985 | Uzuka | 310/43 |
| 4,620,139 | 10/1986 | Egami et al. | 310/68 R |
| 4,658,312 | 4/1987 | Elsässer et al. | 310/156 |
| 4,680,655 | 7/1987 | Sugawara | 360/99 |

Primary Examiner—Patrick R. Salce
Assistant Examiner—D. L. Rebsch
Attorney, Agent, or Firm—Lewis H. Eslinger; Jay H. Maioli

[57] ABSTRACT

A disc spindle motor of the axial air-gap type includes a record disc chucking portion having a center boss with a disc support surface formed around the center boss. A magnet is arranged adjacent and beneath the disc support surface to hold a magnetic central core of the record disc against the support surface. The rotor of the spindle motor has a rotor magnet affixed to a rotor yoke and facing the stator coils. The center boss and disc support of the disc chucking portion and the rotor yoke of the rotor are all integrally formed in one piece by molding a resin, such as nylon-6, with a magnetic powder, such as iron powder.

12 Claims, 2 Drawing Sheets

DISC DRIVE WITH INTEGRAL SPINDLE YOKE

BACKGROUND OF THE INVENTION

1. Field of the Invention

This invention relates generally to an axial air-gap motor and, more particularly, to a spindle motor that includes a magnet for holding a recording disc.

2. Description of the Background

Generally, the spindle motor used for driving a magnetic record disc, such as the well-known floppy disc, is of the axial air-gap type. This motor is typically brushless and, in order to chuck the disc, employs a magnet on the rotor to attract the magnetic center core of the floppy disc and hold it firmly. The properly chucked floppy disc is then rotated by the spindle motor. More specifically, the magnetic center core of the floppy disc is attracted by the magnet that is formed on an upper portion of the rotor of the spindle motor. Such a brushless spindle motor typically employs a rotor that includes a housing that is rotatably supported on an axle by means of upper and lower bearings. The rotor then includes a ring-shaped disc-attracting magnet that is affixed to the housing and that projects upwardly toward the floppy disc. The rotor further includes a circular disc-shaped rotor yoke that is formed of magnetic metal and is fitted onto a portion of the housing that is concentric with the axle. A ring-shaped rotor magnet is adhesively affixed to the lower surface of the rotor yoke.

In those situations where it is necessary to increase the forces of magnetic attraction exerted on the center core of the magnetic disc that hold it against the housing of the rotor, the housing can be formed of magnetic material. On the other hand, there are situations in which this magnetic metal housing provides a disadvantage in that it prevents easy detection of the rotation of the magnetic record disc that would otherwise be possible by detecting leakage magnetic flux from the magnet used to hold the disc against the housing. When such disc rotation detection is required, the leakage magnetic flux is more easily detected if the housing is made of non-magnetic material, such as aluminum, for example.

The stator that supports the axle of the rotor housing includes a base table having a U-shaped cross section that is affixed to the axle by means of a boss. A coil substrate is affixed to the upper surface of the base table by suitable fasteners, such as screws, and faces the rotor magnet with a predetermined clearance. A plurality of stator coils are disposed on the facing surface of the coil substrate and are equally spaced around the axle with a predetermined clearance from the rotor magnet.

Upon appropriately mounting the magnetic disc on the rotor, the magnetic forces of the disc-attracting magnet affixed to the rotor housing cause the center core of the magnetic record disc to be attracted thereto and firmly held to the upper mounting surface of the housing. Thus, upon application of power to the motor, in this case to the coils of the stator, the rotor will turn and thereby rotate the magnetic sheet of the floppy disc along with the rotor.

During manufacture and assembly of the housing and rotor yoke of this known brushless, axial air-gap motor, there are a large number of methods and machining processes involved, as well as the requirement for a large number of parts. Thus, the total man hours required to assemble the rotor of such a motor is quite high relative to the overall motor assembly. Accordingly, manufacturing costs for this kind of spindle motor, as presently known, are much higher than desired. Furthermore, because both the housing and the rotor yoke are formed of magnetic metallic materials, the total weight of the rotor is increased beyond what is desirable.

OBJECTS AND SUMMARY OF THE INVENTION

Accordingly, it is an object of the present invention to provide a spindle motor that can eliminate the above-noted defects inherent in the prior art.

Another object of this invention is to provide a spindle motor that is light in weight and can be manufactured with reduced cost relative to the known spindle motors.

It is still another object of the present invention to provide a spindle motor having a reduced number of parts and requiring reduced labor during assembly, relative to the known spindle motors.

In accordance with an aspect of the present invention, the above-described objects are achieved by providing an axial air-gap spindle motor that includes a spindle portion with a center boss and a disc support provided around such center boss. The motor portion has a rotor that is formed by the rotor magnet attached to a rotor yoke and a stator that includes stator windings affixed to the stator base. The center boss and the disc support of the spindle and the rotor yoke of the rotor are all integrally formed as a single unitary element and, specifically, are formed by molding a composite material formed of a resin and a magnetic powder.

The overall motor drive assembly includes the rotor having the yoke portion that supports the magnetic record medium with a first magnet to attract the magnetic central core portion of the magnetic record disc thereto. An axle or rotary spindle projects from a center boss of the yoke portion that also includes a second magnet, which is the rotor magnet. The first magnet is attached to a first, upper surface of the yoke portion with the second magnet being attached to a second, lower surface on the side opposite the first surface. The entire yoke portion is formed as a single unitary element from a composite including resin and magnetic powder that can be accurately molded with high precision. The stator rotatably supports the rotor and has a plurality of stator windings that are mounted on a stator yoke and are so arranged to drive the rotor to rotate about the rotational axle or spindle. The stator windings are mounted so as to maintain a predetermined clearance relative to the second magnet formed on the lower surface of the rotor yoke.

The above and other objects, features, and advantages of the present invention will become apparent from the following detailed description of illustrative embodiments thereof, to be read in conjunction with the accompanying drawings, in which like reference numerals indicate the same or similar elements.

DETAILED DESCRIPTION OF PREFERRED EMBODIMENTS

Figure 1:
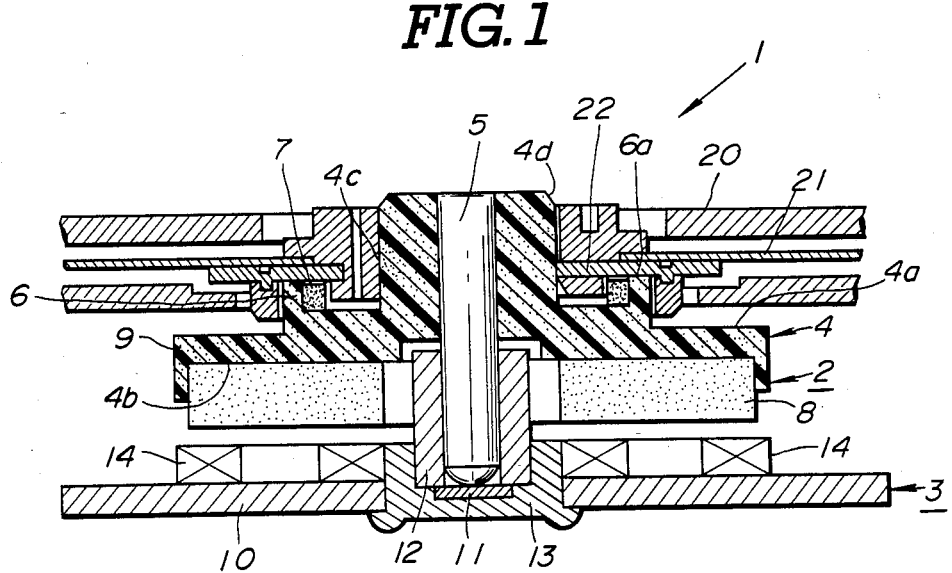
FIG. 1 is an elevational view in cross section of a flat spindle motor according to a preferred embodiment of the present invention.

In FIG. 1, a flat, thin spindle motor 1 is of the so-called axial air-gap type and is a brushless motor used to drive a magnetic record disc, shown generally at 20. Magnetic disc 20 is a so-called floppy disc in which a circular magnetic sheet 21 forms a magnetic record medium that might be used for an electronic still camera, for example. Motor 1 generally comprises a rotor 2 and a stator 3.

The rotor 2 includes a rotor yoke 4, an axle or spindle 5, a circular disc-attracting magnetic 7, and a rotor magnet 8. Those elements make up the entire rotor 2. Axle 5 is pressed into a center bore formed in the rotor yoke 4, and axle 5 projects downwardly therefrom toward rotor magnet 8. Disc-attracting magnet 7 is annular in shape and is affixed to an inner peripheral surface of a circular rib 6 that is integrally formed with rotor yoke 4. More specifically, circular rib 6 projects upwardly from an upper surface 4a of rotor yoke 4. Rotor yoke 4 has a lower surface 4b that is opposite upper surface 4a; and attached to lower surface 4b is rotor magnet 8, which is also annular or ring-shaped. Rotor magnet 8 is a permanent magnet.

According to the present invention, the manufacture of rotor yoke 4 is extremely simplified by providing a single, unified structure that is molded of a composite material, which includes a resin and a magnetic powder. One example of such composite material is a mixture of nylon-6 and iron powder. The iron particles are represented at 9 in the cross-section view of the rotor 2 in FIG. 1. The axle 5 is press fit into a boss formed as an upstanding, center, cylindrical axle portion 4c of rotor yoke 4. An upper outer surface of center cylindrical boss 4c of rotor yoke 4 is chamfered or tapered in order to facilitate easy insertion of a center core 22 of magnetic disc 20, shown in FIG. 2, over center cylindrical axle portion 4c of rotor yoke 4. Rotor yoke 4 is also formed such that annular rib 6 has an upper surface 6a that is smooth and flat and serves to as a locating surface for positioning center core 22 of magnetic disc 20.

The percentage of iron powder 9 relative to the resin material used to mold rotor yoke 4 is based upon a desired relationship between the magnetic qualities of disc-attracting magnet 7 and rotor magnet 8, as well as on the desired amount of strength necessary for the rotor yoke itself. For example, it has been found that a 30% to 50% by volume ratio of iron powder to resin, such as nylon-6, provides advantageous results. Other polyamide resins could also be used, such as nylon-11, nylon-12, or polyphenylene sulfide.

Disc-attracting magnet 7 has its magnetic poles arranged such that the north pole (N) is on the upward facing surface and the south pole (S) is on the downward facing surface in the motor as shown in FIG. 1. Disc-attracting magnet 7 is mounted in a recess formed between center cylindrical axle portion 4c and annular rib 6 of rotor yoke 4. In this embodiment, disc-attracting magnet 7 is affixed to rotor yoke 4 using a suitable adhesive around the inner peripheral surface of annular rib 6 and is arranged to be below upper locating surface 6a of annular rib 6. That is, a measurable clearance exists between the upper surface of disc-attracting magnet 7 and the bottom surface of center core 22 of magnetic disc 20. No contact is present. The rotor magnet 8 is magnetized to have alternating north (N) and south (S) poles and is firmly affixed to lower surface 4b of rotor yoke 4.

The stator of this flat, thin, axial air-gap motor 1 includes a stator yoke 10, a boss 13, and a plurality of stator coils 14. Stator yoke 10 is a generally circular metal plate structure and boss 13 is formed therein having a thrust bearing 11 that rotatably supports the axle or shaft 5 of rotor 2. Thrust bearing 11 is formed of a resin material, such as nylon-6 or a polyacetal material, for example. The end of axle 5 that bears against bearing 11 is polished to a smooth surface, as is well-known. Boss 13 is pressed into stator yoke 10 and includes a metal bushing or bearing 12 that permits rotation of shaft 5 of rotor 2. A plurality of stator coils 14 are symmetrically disposed radially about boss 13 and are affixed to stator yoke 10. A predetermined amount of clearance is present between stator coils 14 and the lower surface of rotor magnet 8, thereby leading to the name axial air-gap motor.

Figure 2:
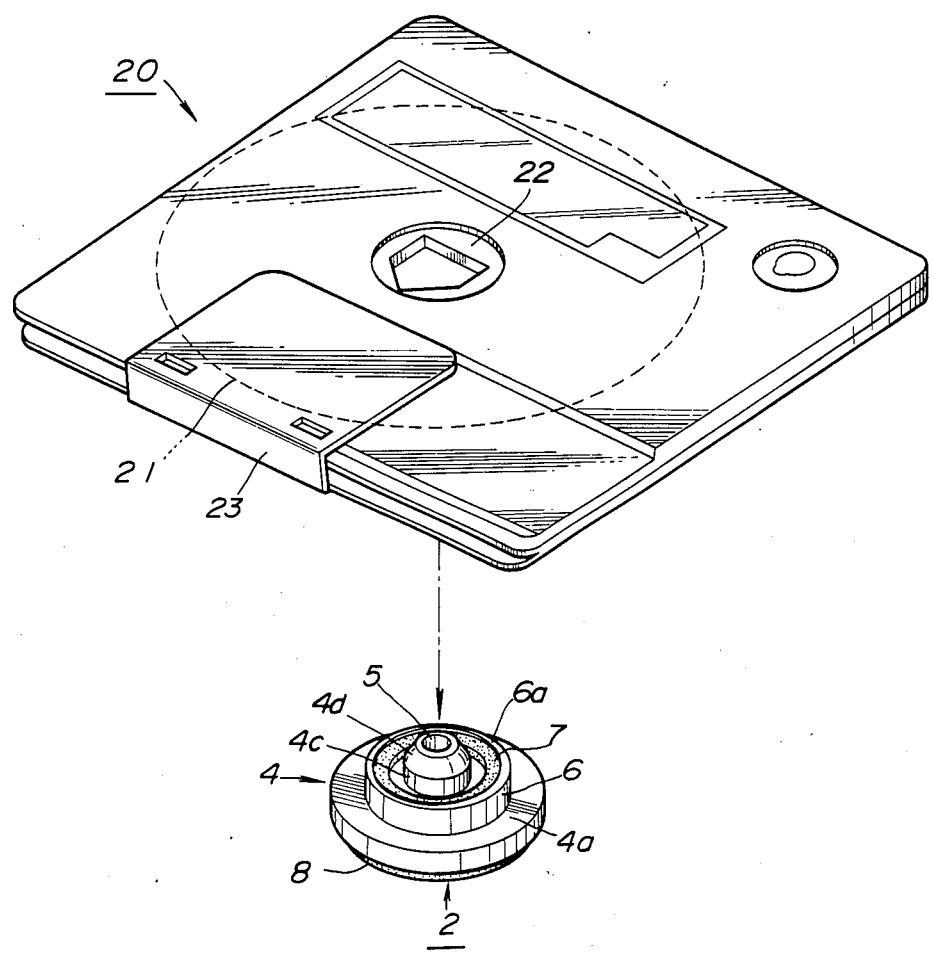
FIG. 2 is a perspective view of a recording medium in juxtaposition with a drive rotor, such as shown in FIG. 1.

Referring to FIG. 2 the upper portion of rotor 2 is shown in juxtaposition to magnetic record disc 20. In that regard, note that disc-attracting magnet 7 is beneath the top locating surface 6a of annular rib 6 on rotor yoke 4. In addition, note that the tapered or chamfered surface 4d is formed on the center cylindrical axle portion 4c. Also shown in FIG. 2 is a shutter 23 that is conventionally employed in magnetic discs of this kind and, upon being slid to one side, provides access to magnetic sheet 21 by a recording or playback head (not shown).

Moreover, in the flat-type spindle motor 1 of the preferred embodiment, center core 22 of magnetic disc 20 is attracted toward disc-attracting magnet 7 due to the intensity of the magnetic field produced by magnet 7 and is held on upper surface 6a of annular rib 6 of rotor yoke 4 when magnetic disc 20 is in its correct position. At that time, by application of power to stator coils 14 rotor 2 commences rotation and magnetic sheet 21 of magnetic disc 20 is rotated along with rotor 2.

Although rotor yoke 4 is required to be a ferromagnetic yoke having a high permeability in order to provide a magnetic path for rotor magnet 8, a further requirement is made of rotor yoke 4 in that it needs to approximate non-magnetic material so that the leakage magnetic flux of the disc-attracting magnet 7 can be detected by a rotational detector (not shown). The leakage magnetic flux from disc-attracting magnet 7 can be detected and used in a position generator to indicate the rotational position of the magnetic sheet 21 in the magnetic disc 20. Therefore, to meet both of these requirements the present invention teaches the formation of rotor yoke 4 from a composite material formed of the resin and iron powder, thereby satisfying both required characteristics for rotor magnet 8 and disc-attracting magnet 7. In addition, rotor yoke 4 is a single unitary part and is made to close tolerances in one molding operation. The composite molded rotor yoke 4 then forms an integral part of motor 1 and provides both ferromagnetic and non-magnetic properties. Thus, the number of parts used to assemble motor 1 and the labor hours required to assemble that motor are both reduced accordingly. Consequently, manufacturing costs of motor 1 are reduced relative to the costs of manufacturing disc motors known heretofore.

In addition, because rotor yoke 4 is formed of a composite resin such as nylon-6 mixed with iron powder, the accuracies of the reference outer diameter of the center cylindrical axial portion 4c of rotor yoke 4 and the horizontal position of upper reference surface 6a of annular rib 6 and the strength of the rotor yoke 4 all can be improved. The repeatability of close tolerances in molding operations is well known. In this fashion, the accuracy of positioning center core 22 of magnetic disc 20 relative to rotor yoke 4 can be assured. Furthermore, because center cylindrical axle portion 4c of rotor yoke 4 slides on center core 22 of magnetic disc 20, a wear-resistant characteristic is desirable. Such wear-resistance is further assured due to the strength of the rotor yoke being made of the mixture of iron powder and resin material, such as nylon-6, which is known to have excellent wear resistant properties.

Figure 3:
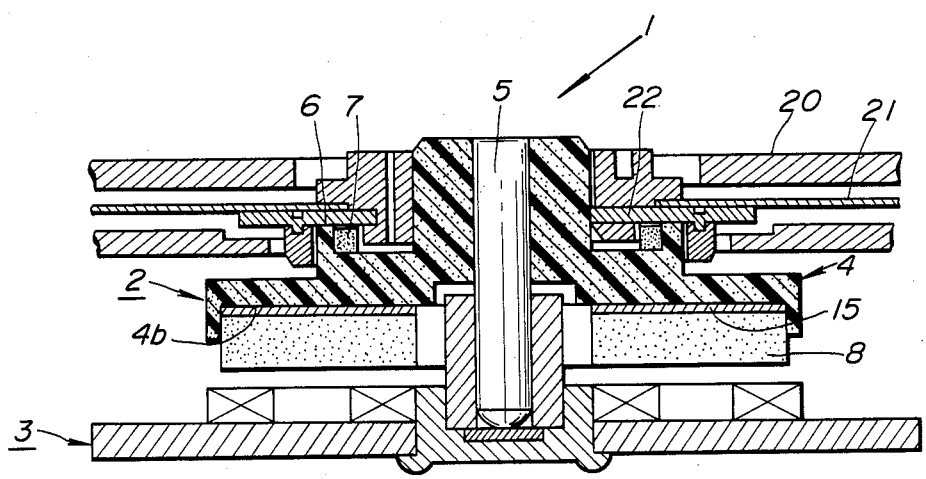
FIG. 3 is an elevational view in cross section of a flat spindle motor according to another embodiment of the present invention.

An alternate embodiment of the present invention is shown in FIG. 3 in which like or similar parts have the same reference characters so that a detailed description of these parts is not required. In fact, the only difference between the embodiments of FIGS. 1 and 3 is the interposition of an auxiliary yoke 15 between rotor magnet 8 and the lower surface 4b of rotor yoke 4. The auxiliary yoke 15 is formed as a thin disc of a ferromagnetic material, such as iron or steel. By utilizing auxiliary yoke 15, formed of a ferromagnetic material, the leakage magnetic flux from rotor magnet 8 will be substantially reduced. This, of course, is important in any system employing magnetic recording, as well as preventing interference with position detection.

Therefore, it is seen from the above that by following the present invention, the magnet used to attract and attach the center core of the recording medium to the rotor is fixed to one surface of the rotor yoke and the rotor magnet used to drive the recording medium is attached to the other surface thereof. Thus, the number of parts and man-hours required to assemble a flat, thin spindle motor of the axial air gap-type such as described hereinabove is substantially reduced and manufacturing costs are similarly reduced relative to previously known motors of this kind. In addition, the rotor yoke is integrally formed by molding a composite of resin and magnetic powder such that molding accuracy, strength, and productivity is further improved, thus lowering manufacturing costs as well.

The above description is given on preferred embodiments of the invention, but it will be apparent that many modifications and variations could be effected by one skilled in the art without departing from the spirit or scope of the novel concepts of the invention, which should be determined by the appended claims.

What is claimed is:

1. A disc spindle axial air-gap motor comprising:
a spindle portion having a center boss element and a disc support element provided around the center boss element;
a motor portion having a rotor including a rotor magnet attached to a rotor yoke and a stator having stator windings arranged on a stator base said rotor magnet and stator windings having an axial air-gap therebetween to form an axial air-gap motor; and
wherein said center boss element and said disc support element of the spindle portion and said rotor yoke of said rotor are integrally formed as a single molded element from a resin and magnetic powder.

2. A disc spindle motor according to claim 1, wherein said stator base has bearings formed therein and a rotor axle affixed at the center of the spindle portion is supported by said bearing so as to form said disc spindle motor as an axial air-gap motor.

3. A disc spindle motor according to claim 2, wherein said disc support element of said spindle portion is formed having a circular, upraised rib and includes a ring-shaped magnet arranged adjacent said rib.

4. A disc spindle motor according to claim 3, further comprising a disc-shaped auxiliary yoke interposed between said motor magnet and said rotor yoke of said rotor.

5. A spindle motor for driving a magnetic record medium, comprising:
a rotor having a yoke portion for supporting a magnetic recording medium, a first magnet for attracting a magnetic core of the magnetic recording medium thereto, a rotational axle affixed to a center boss of said yoke portion, and a second magnet, said first magnet being attached to a first surface of the yoke portion, said second magnet being attached to a second surface of said yoke opposite said first surface, and said yoke portion being formed of a resin mixed with a magnetic powder; and
a stator for rotatably supporting said rotor, having a plurality of stator windings and a yoke portion on which said stator windings are disposed to rotate said rotor on said rotational axle, said plurality of stator windings being arranged with a predetermined clearance from said second magnet to form an axial air-gap therebetween.

6. A spindle motor according to claim 5, wherein said magnetic powder is an iron powder.

7. A spindle motor according to claim 5, wherein said resin is a nylon-6.

8. A spindle motor according to claim 5, wherein said yoke portion is integrally formed with an annular rib on said first surface of said yoke portion, and said first magnet is annularly shaped and is attached to an inner peripheral surface of said annular rib.

9. A spindle motor according to claim 8, wherein a surface of said annular rib is a reference surface for abutting said magnetic core of the magnetic recording medium.

10. A spindle motor according to claim 9, wherein said annular rib has a height greater than a height of said annularly shaped first magnet such that a space is provided between the free end surface of the rib and a free end surface of the first magnet.

11. A spindle motor according to claim 9, further comprising an auxiliary yoke interposed between said second magnet and said yoke portion of said rotor for preventing a leakage magnetic flux from said second magnet.

12. A spindle motor acording to claim 9, wherein said center boss includes a tapered guide surface to facilitate insertion of said center boss into the magnetic core of the magnetic recording medium.

* * * * *

UNITED STATES PATENT AND TRADEMARK OFFICE
CERTIFICATE OF CORRECTION

PATENT NO. : 4,788,464
DATED : November 29, 1988
INVENTOR(S) : Mitsuo Nishikawa et al.

It is certified that error appears in the above-identified patent and that said Letters Patent is hereby corrected as shown below:

Column 3, line 26, delete ";".
Column 5, line 43, after "thus" insert --,--.

IN CLAIMS

Column 5, line 57, change "ha ving" to --having--
Column 6, line 14, change "motor" to --rotor--.

Signed and Sealed this

Twelfth Day of September, 1989

*Attest:*

DONALD J. QUIGG

*Attesting Officer*     *Commissioner of Patents and Trademarks*